(12) United States Patent
Qiao (10) Patent No.: US 11,453,019 B2
(45) Date of Patent: Sep. 27, 2022

(54) SPRAYER

(71) Applicant: INTRADIN (SHANGHAI) MACHINERY CO., LTD., Shanghai (CN)

(72) Inventor: Xuetao Qiao, Shanghai (CN)

(73) Assignee: INTRADIN (SHANGHAI) MACHINERY CO., LTD., Shanghai (CN)

(*) Notice: Subject to any disclaimer, the term of this patent is extended or adjusted under 35 U.S.C. 154(b) by 0 days.

(21) Appl. No.: 17/010,352

(22) Filed: Sep. 2, 2020

(65) Prior Publication Data

US 2022/0032329 A1 Feb. 3, 2022

(30) Foreign Application Priority Data

Jul. 28, 2020 (CN) .......................... 202010738536.9

(51) Int. Cl.
*B05B 7/24* (2006.01)
*B05B 7/00* (2006.01)

(52) U.S. Cl.
CPC .......... *B05B 7/2416* (2013.01); *B05B 7/0075* (2013.01); *B05B 7/2424* (2013.01)

(58) Field of Classification Search
CPC ..... B05B 7/045; B05B 7/0466; B05B 7/0078; B05B 3/105; B05B 3/1092; A01M 7/006; A01M 7/0017; A01M 7/0028
See application file for complete search history.

(56) References Cited

U.S. PATENT DOCUMENTS

| | | | |
|---|---|---|---|
| 2,607,574 A * | 8/1952 | Hession, Jr. ............ | B05B 3/105 277/380 |
| 4,270,698 A * | 6/1981 | Bisa ......................... | B05B 5/04 239/214.15 |
| 4,473,188 A * | 9/1984 | Ballu .................. | A01M 7/0028 239/223 |
| 4,795,095 A * | 1/1989 | Shepard ................. | B05B 3/105 239/290 |
| 7,721,976 B2 * | 5/2010 | Nolte .................... | B05B 5/0415 239/222.11 |
| 8,006,916 B2 * | 8/2011 | Metcalf ..................... | F24F 6/14 239/128 |
| 9,375,734 B1 * | 6/2016 | van der Steur ....... | B05B 3/1035 |
| 9,878,337 B1 * | 1/2018 | Hong .................... | B05B 7/0075 |
| 10,342,934 B2 * | 7/2019 | Hong ................ | A61M 15/0025 |

(Continued)

FOREIGN PATENT DOCUMENTS

| CN | 106040472 A | 10/2016 |
|---|---|---|
| CN | 206196760 U | 5/2017 |

*Primary Examiner* — Joseph A Greenlund (57) ABSTRACT

A sprayer includes a housing assembly, a spray nozzle assembly and a fan assembly. The housing assembly is connected to the spray nozzle assembly. The housing assembly is configured to hold liquid, and the fan assembly is configured to generate air flow. The spray nozzle assembly is configured to atomize and spray the liquid from the housing assembly, and blowout the air flow generated by the fan assembly. When the blowing is needed, the air flow generated by the fan assembly passes through the spray nozzle assembly and flows outward. When the spraying is needed, the spray nozzle assembly atomizes and sprays the liquid from the housing assembly. The sprayer is capable of blowing and spraying, which enables the spray to have an improved applicability.

9 Claims, 6 Drawing Sheets

(56) References Cited

U.S. PATENT DOCUMENTS

| | | | |
|---|---|---|---|
| 10,945,424 B2* | 3/2021 | Pellenc | B05B 7/0458 |
| 2006/0208102 A1* | 9/2006 | Nolte | B05B 3/1092 |
| | | | 239/224 |
| 2008/0047591 A1* | 2/2008 | Seitz | B05B 15/555 |
| | | | 134/22.18 |
| 2011/0000978 A1* | 1/2011 | Chichep-Ortiche | F03D 9/00 |
| | | | 239/222.11 |
| 2011/0036926 A1* | 2/2011 | Nunes | F24F 6/12 |
| | | | 239/214 |
| 2011/0089258 A1* | 4/2011 | Pun | B05B 3/10 |
| | | | 239/214.23 |
| 2011/0259978 A1* | 10/2011 | Ptak | B05B 7/2424 |
| | | | 239/398 |
| 2015/0258555 A1* | 9/2015 | Peterson | B05B 3/1064 |
| | | | 239/223 |
| 2016/0121356 A1* | 5/2016 | Ballu | B05B 3/02 |
| | | | 239/106 |
| 2016/0303335 A1* | 10/2016 | Hong | A61M 15/0025 |
| 2016/0332174 A1* | 11/2016 | Leslie | B05B 7/2416 |
| 2018/0160670 A1* | 6/2018 | Pellenc | B05B 3/105 |
| 2018/0168140 A1* | 6/2018 | Pellenc | B05B 7/0081 |
| 2018/0339258 A1* | 11/2018 | Jeon | B05B 3/022 |
| 2019/0176171 A1* | 6/2019 | Hendy | B05B 3/0427 |
| 2022/0030846 A1* | 2/2022 | Wang | B05B 11/0059 |
| 2022/0032328 A1* | 2/2022 | Wang | A01M 7/006 |
| 2022/0032329 A1* | 2/2022 | Qiao | B05B 7/2416 |
| 2022/0088625 A1* | 3/2022 | Qiao | B05B 5/0407 |

* cited by examiner

SPRAYER

CROSS-REFERENCE TO RELATED APPLICATIONS

This application claims the benefit of priority from Chinese Patent Application No. 202010738536.9, filed on Jul. 28, 2019. The content of the aforementioned applications, including any intervening amendments thereto, is incorporated herein by reference in its entirety.

TECHNICAL FIELD

The present application relates to agricultural equipment, and more particularly to a sprayer.

BACKGROUND

As a commonly used agricultural insecticidal tool, sprayers atomize liquid medicine into mist and spray them onto the objects by air suction. However, the existing sprayer has a single function. For example, spraying and blowing functions are not combined in the existing sprayer.

SUMMARY

The object of the disclosure is to provide a sprayer, which aims to solve the technical problem that the existing sprayer has a single function, and blowing and spraying cannot be simultaneously realized by the existing sprayer.

In view of the above technical problem in the prior art, the present disclosure provides a sprayer, comprising:
  a housing assembly;
  a spray nozzle assembly; and
  a fan assembly;
    wherein the housing assembly is connected to the spray nozzle assembly, and the housing assembly is configured to contain a liquid; the fan assembly is configured to generate air flow; the spray nozzle assembly is configured to atomize and eject the liquid from the housing assembly, and blow out the air flow generated by the fan assembly.

In some embodiments, the spray nozzle assembly comprises a connector, a first blade and a spray nozzle; wherein the first blade is connected to the spray nozzle, and an end of the first blade away from the spray nozzle is rotatably arranged at the connector; the connector is connected to the housing assembly; the air flow generated by the fan assembly propels the first blade to rotate, and the first blade drives the spray nozzle to rotate, so that the liquid from the housing assembly enters the spray nozzle and is atomized and sprayed.

In some embodiments, the air flow generated by the fan assembly drives the liquid sprayed from the spray nozzle to move outward.

In some embodiments, the housing assembly comprises a first housing and a second housing which is connected to the first housing; the second housing is configured to contain the liquid; the spray nozzle assembly is connected to the first housing, and the fan assembly is arranged in the first housing.

In some embodiments, the fan assembly comprises a motor and a second blade which is connected to the motor; the motor drives the second blade to rotate and generate air flow.

In some embodiments, the fan assembly further comprises a guide sleeve which is connected to an end of the motor close to the spray nozzle assembly, and is configured to guide the air flow generated by the second blade, so that the air flow flows towards the spray nozzle assembly.

In some embodiments, the first housing comprises an air inlet and an air outlet which allow an interior of the first housing to communicate with an external environment; the spray nozzle assembly is arranged close to the air outlet; the fan assembly is arranged close to the air inlet; air in the external environment enters the first housing through the air inlet, and the air flow is generated through the fan assembly and flows towards the spray nozzle assembly, and then flows outward through the air outlet.

In some embodiments, the sprayer further comprises an air pipe assembly; the air pipe assembly partially extends into the first housing from the air outlet, and is connected to the first housing; the air pipe assembly has an air passage which is respectively connected to the air inlet and air outlet; the spray nozzle assembly and the fan assembly are respectively arranged in the air passage; the air flow generated through the fan assembly flows towards the spray nozzle assembly through the air passage.

In some embodiments, the air pipe assembly comprises a first air pipe and a second air pipe which is connected to the first air pipe; the first air pipe comprises a first sub-passage, and the second air pipe comprises a second sub-passage; and the air passage is formed by the first sub-passage and the second sub-passage; the spray nozzle assembly is arranged in the first sub-passage, and the fan assembly is arranged in the second sub-passage.

In some embodiments, the second air pipe has a duct which is arranged in the second passage; and the motor is arranged in the duct, and the duct is configured to limit the air flow generated by the motor.

Compared with the prior art, the present disclosure has the following beneficial effects:

When the blowing is needed, the air flow generated by the fan assembly passes through the spray nozzle assembly and flows outward. When the spraying is needed, the spray nozzle assembly atomizes and sprays the liquid from the housing assembly. The sprayer is capable of blowing and spraying, which enables the spray to have an improved applicability.

BRIEF DESCRIPTION OF THE DRAWINGS

In order to explain the embodiments of the present disclosure or the technical solutions in the prior art more clearly, the drawings required in the embodiments or the description of the prior art will be briefly introduced as follows. Obviously, the drawings in the following description are only some embodiments of the present disclosure. For those of ordinary skill in the art, other drawings can be obtained without paying any creative efforts according to the structures shown in these drawings.

In the drawings: 10, sprayer; 1, housing assembly; 11, first housing; 111, first sub-housing; 112, second sub-housing; 113, handle; 114, air inlet; 115, air outlet; 12, second housing; 2, spray nozzle assembly; 21, connector; 22, first blade; 23, spray nozzle; 24, connecting pipe; 241, first cavity; 25, rotation shaft; 251, second cavity; 252, opening; 26, bearing of the spray nozzle assembly; 27 bearing locating part; 28, fixture; 3, fan assembly; 31, motor; 311, drive shaft; 32, second blade; 33, guide sleeve; 34, first connector; 35, guide cover; 36, support group; 361, first support; 362, second support; 37, bearing set of the fan assembly; 371, first bearing; 372, second bearing; 38, limit part; 4, liquid delivery assembly; 41, pump; 5, air inlet shield; 6, air pipe assembly; 61, air passage, 62, first air pipe; 621, first sub-passage; 63, second air pipe; 631, second sub-passage; 632, duct; 633, flow deflector; 64, third air pipe; 641, third sub-passage; 7, blow pipe; 8, switch button; 9, battery.

DETAILED DESCRIPTION OF EMBODIMENTS

The disclosure will be further described clearly and completely below with reference to the accompanying drawings in embodiments. Obviously, the described embodiments are only a part of the embodiments of the present disclosure. Based on the embodiments of the present disclosure, all other embodiments obtained by a person of ordinary skill in the art without making creative efforts fall within the protection scope of the present disclosure.

It should be noted that all directional indications (such as up, down, left, right, front, rear, etc.) in the embodiments of the present disclosure are only used to explain the relative position relationship, motion situation, etc. between the components under a certain attitude (as shown in the drawings). If the specific attitude changes, the directional indication will change accordingly.

In addition, terms "first", "second", etc. in the present disclosure are for descriptive purposes only, and cannot be construed as indicating or implying their relative importance or implicitly indicating the number of technical features indicated. Thus, the features defined as "first" or "second" may explicitly or implicitly indicate that at least one of the features is included. The term "and/or" when used in a list of two or more items, means that any one of the listed items can be employed by itself, or any combination of two or more of the listed items can be employed. In addition, various embodiments can be combined with each other, in an manner that enables the implementation of the present invention by those skilled in the art, and the combination of the embodiments that is expected in an inappropriate way will not be considered as falling within the spirit of the present invention.

Figure 1:
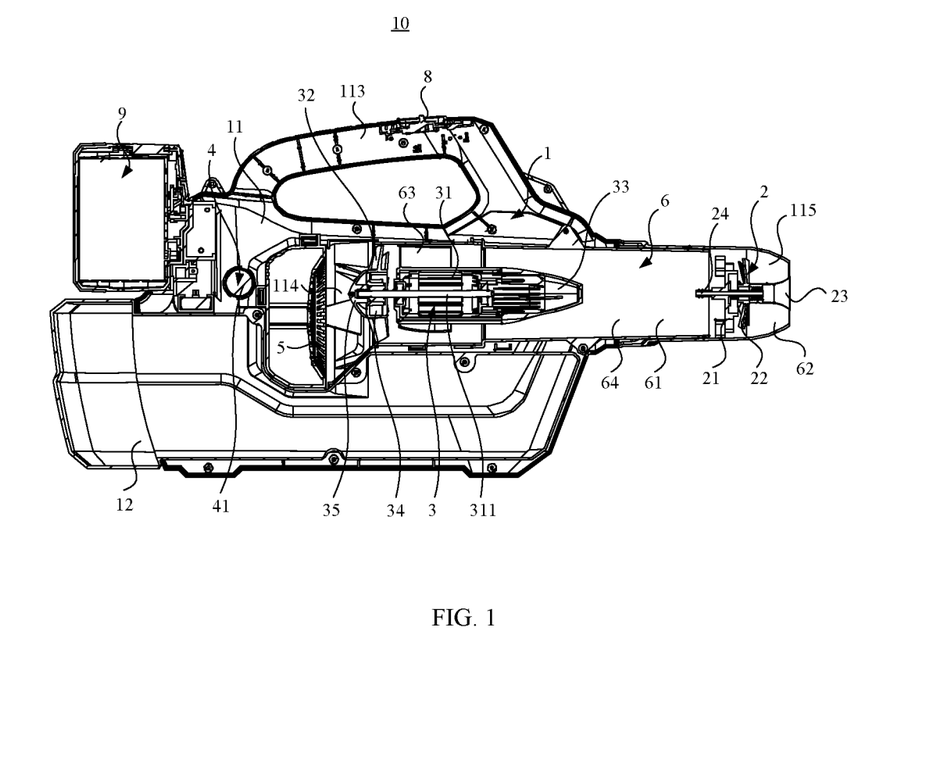
FIG. 1 is a cross-sectional view of a sprayer according to an embodiment of the present disclosure.
Figure 2:
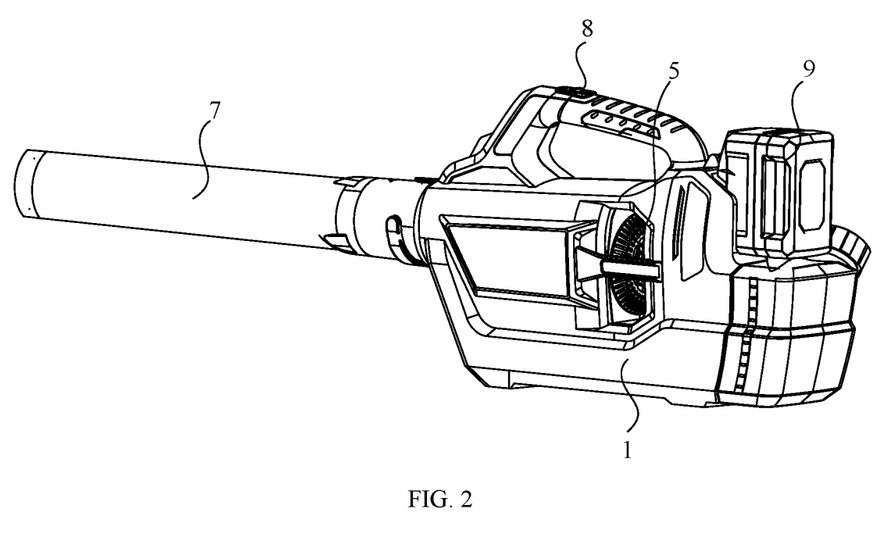
FIG. 2 is a schematic diagram of the sprayer according to an embodiment of the present disclosure.

As shown in FIGS. 1 and 2, the present disclosure provides a sprayer 10, including a housing assembly 1, a spray nozzle assembly 2 and a fan assembly 3. The housing assembly 1 which is configured to contain a liquid is connected to the spray nozzle assembly 2. The fan assembly 3 is configured to generate air flow. The spray nozzle assembly 2 is configured to atomize and spray the liquid from the housing assembly 1, and blow out the air flow generated by the fan assembly 3.

When the blowing is needed, the air flow generated by the fan assembly 3 passes through and is propelled out of the spray nozzle assembly 2. When the spraying is needed, the spray nozzle assembly 2 atomizes and sprays the liquid from the housing assembly 1. The sprayer is capable of blowing and spraying, which enables the sprayer to have an improved applicability.

Figure 3:
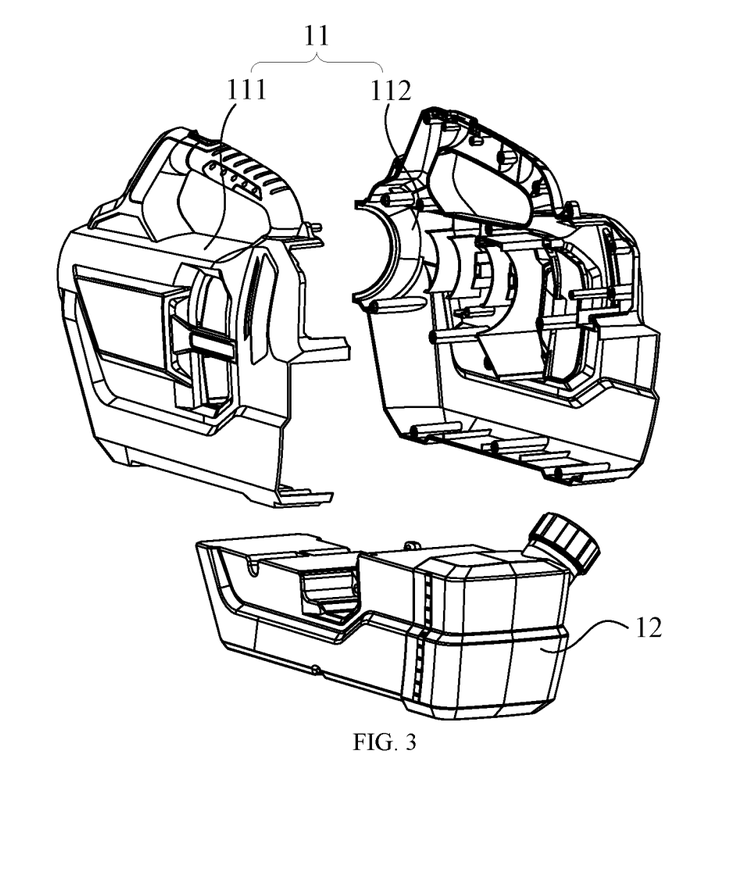
FIG. 3 is a schematic diagram of a housing assembly according to an embodiment of the present disclosure.

As shown in FIG. 3, the housing assembly 1 includes a first housing 11 and a second housing 12 which is connected to the first housing 11. The second housing 12 is configured to contain the liquid. The spray nozzle assembly 2 is connected to the first housing 11, and the fan assembly 3 is arranged in the first housing 11.

The first housing 11 includes a first sub-housing 111 and a second sub-housing 112 which is connected to the first sub-housing 111. The first sub-housing 111 and the second sub-housing are respectively connected to the second housing 12. The first sub-housing 111 and the second sub-housing 112 can be separated, which facilitates the disassembly and assembly of the first housing 11, thereby improving the disassembly and assembly efficiency of the sprayer 10.

As shown in FIG. 1, a handle 113 is provided on the first housing 11. The handle 113 allows the user to conveniently hold the sprayer 10, thereby improving the user experience.

As shown in FIG. 1, the first housing 11 has an air inlet 114 and an air outlet 115. The air inlet 114 and the air outlet 115 are configured to allow an interior of the first housing 11 to communicate with an external environment. The spray nozzle assembly 2 is close to the air outlet 115, and the fan assembly 3 is close to the air inlet 114. The air in the external environment enters the first housing 11 through the air inlet 114, and an air flow is generated through the fan assembly 3 and blows to the spray nozzle assembly 2, and then blows out through the air outlet 115.

Figure 4:
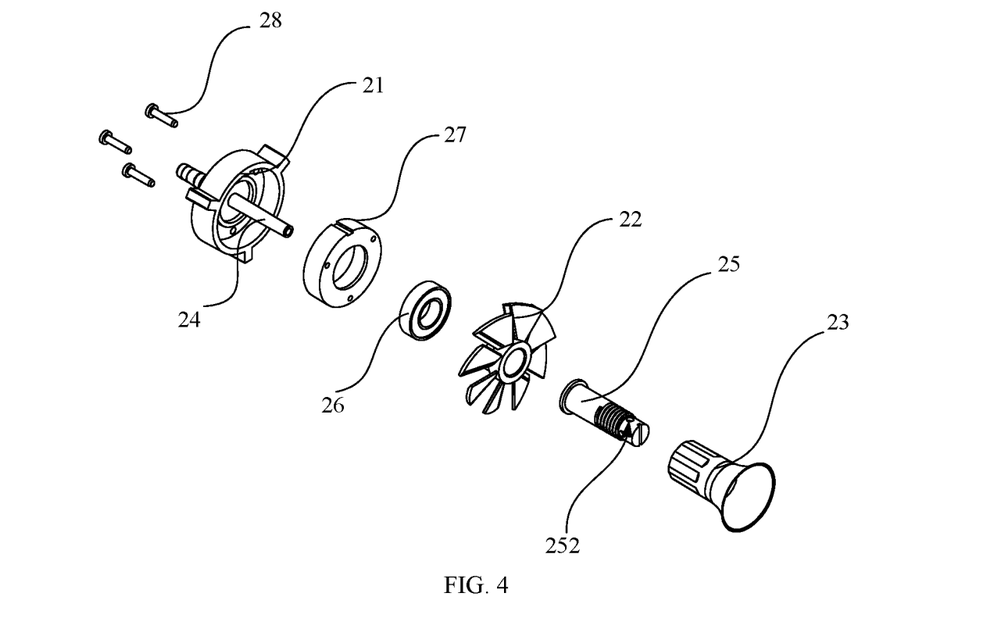
FIG. 4 is an exploded view of a spray nozzle assembly according to an embodiment of the present disclosure.
Figure 5:
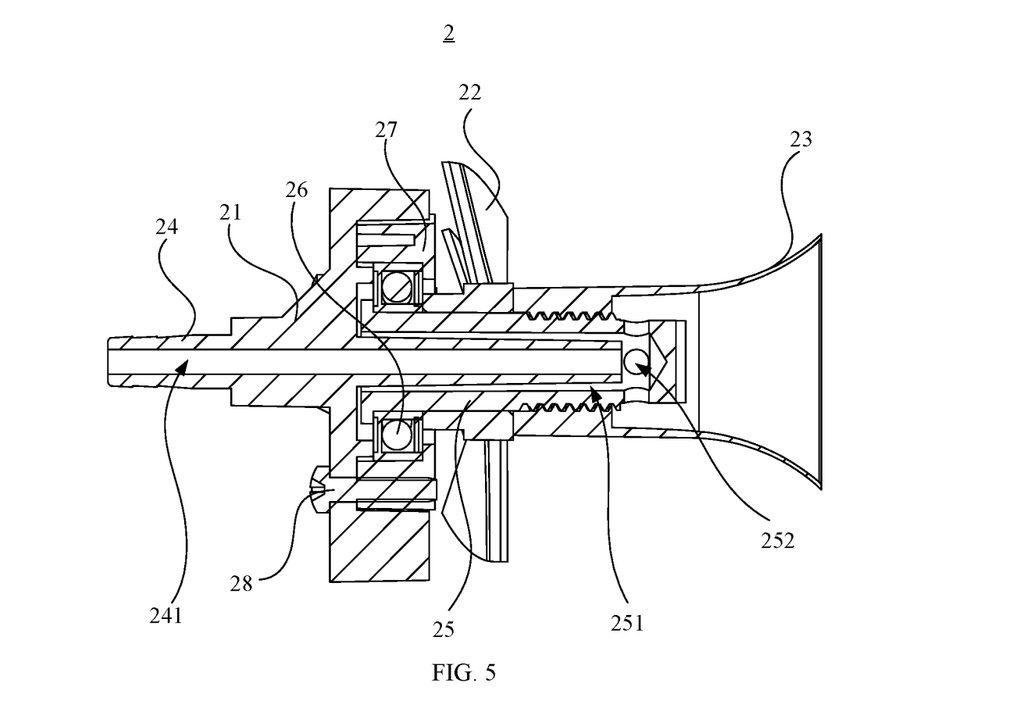
FIG. 5 is a cross-sectional view of the spray nozzle assembly according to an embodiment of the present disclosure.

As shown in FIGS. 4 and 5, the spray nozzle assembly 2 includes a connector 21, a first blade 22 and a spray nozzle 23. The first blade 22 is connected to the spray nozzle 23, and an end of the first blade 22 away from the spray nozzle 23 is rotatably arranged on the connector 21, and the connector 21 is connected to the housing assembly 1. The air flow generated by the fan assembly 3 propels the first blade 22 to rotate, and the first blade 22 drives the spray nozzle 23 to rotate; and the liquid from the housing assembly 1 enters the spray nozzle 23 and is atomized and sprayed. The liquid entered in the spray nozzle 23 rotates with the spray nozzle 23, so that the liquid is more evenly distributed in the spray nozzle 23, thereby achieving a better atomization effect.

Specifically, the air flow generated by the fan assembly 3 propels the first blade 22 to rotate, and the first blade 22 drives the spray nozzle 23 to rotate, so that a vacuum environment is formed inside the spray nozzle 23, and the liquid from the housing assembly 1 enters the spray nozzle 23 to be atomized and sprayed under the action of atmospheric pressure.

The rotation of the first blade 22 can generate an air flow which blows the liquid sprayed from the spray nozzle 23, which not only can further improve the atomization effect of the liquid, but also can further increase the spraying distance of the atomized liquid.

The air flow generated by the fan assembly 3 can drive the liquid sprayed by the spray nozzle 23 to move outward, which not only can further improve the atomization effect of the liquid, but also can further increase the spraying distance of the atomized liquid.

The spray nozzle assembly 2 further includes a connecting pipe 24 which is inserted in the connector 21. The connecting pipe 24 passes through the first blade 22 and extends into the spray nozzle 23. The liquid in the second housing 12 passes the connecting pipe 24 and enters the spray nozzle 23 through a liquid delivery assembly 4.

The spray nozzle assembly 2 further includes a rotation shaft 25. The first blade 22 and the spray nozzle 23 are arranged on the rotation shaft 25. The rotation shaft 25 is rotatably arranged on the connector 21, and the connecting pipe 24 passes through the first blade 22 and extends into the rotation shaft 25. The fan assembly 3 drives the first blade 22 to rotate, and the first blade 22 drives the rotation shaft 25 to rotate. The rotation shaft 25 drives the spray nozzle 23 to rotate, so that the spray nozzle 23 rotates with respect to the connecting pipe 24. The liquid in the second housing 12 passes through the connecting pipe 24 and rotation shaft 25 in turn and enters the spray nozzle 23 through the liquid delivery assembly 4.

The connecting pipe 24 has a first cavity 241, and the rotation shaft 25 has a second cavity 251. The first cavity 241 communicates with the second cavity 251, and the second cavity 251 communicates with an interior of the spray nozzle 23. The liquid enters the spray nozzle 23 through the first cavity 241 and the second cavity 251. Specifically, the first cavity 241 may have a cylindrical shape. In the case that the first cavity 241 is cylindrical in shape, the liquid flows faster through the first cavity 241, and the load applied in the first cavity 241 is uniformly distributed. The second cavity 251 may have a cylindrical shape. In the case that the second cavity 251 is cylindrical in shape, the liquid flows faster through the second cavity 251, and the load applied in the second cavity 251 is uniformly distributed.

A side wall of the rotation shaft 25 is provided with an opening 252 which is configured to allow the second cavity 251 to communicate with the interior of the spray nozzle 23. The liquid enters the spray nozzle 23 through the first cavity 241, the second cavity 251 and the opening 252. Specifically, the opening 252 may be circular.

In an embodiment, a plurality of openings 252 spaced apart is arranged on a side wall of the rotation shaft 25. The openings 252 allow the liquid in the second cavity 251 of the rotation shaft 25 to enter the interior of the spray nozzle 23 from different directions, so that the liquid can be well dispersed in the spray nozzle 23, thereby improving the atomization effect of the liquid. In this embodiment, the number of the openings 252 is four. In some embodiments, the number of the openings 252 are reasonably selected according to the actual situation.

The spray nozzle 23 is flared towards one end of the spray nozzle 23 away from the first blade 22, so that the liquid entering the spray nozzle 23 can be diffused outward better and distributed uniformly, thereby improving the atomization effect of the liquid. In this embodiment, the spray nozzle 23 is in a flared shape. In other embodiments, the spray nozzle 23 is not limited to the flared shape, and the specific shape of the spray nozzle 23 can be reasonably designed according to the actual situation.

The spray nozzle assembly 2 further includes a bearing 26 which is arranged on the rotation shaft 25. The bearing 26 of the spray nozzle assembly is configured to support the rotation shaft 25 that is rotatably connected to the connector 21 through the bearing 26 of the spray nozzle assembly.

The spray nozzle assembly 2 further includes a bearing locating part 27 which is sheathed on the bearing 26 of the spray nozzle assembly. The bearing locating part 27 is configured to locate the bearing 26 of the spray nozzle assembly, and the bearing locating part 27 is connected to the connector 21. The rotation shaft 25 is rotatably connected to the connector 21 through the bearing 26 of the spray nozzle assembly and the bearing locating part 27. The fan assembly 3 drives the first blade 22 to rotate, and the first blade 22 drives the rotation shaft 25 to rotate, and the rotation shaft 25 drives the spray nozzle 23 to rotate. The rotation shaft 25 rotates with respect to the connector 21 through the bearing 26 of the spray nozzle assembly and the bearing locating part 27, so that the spray nozzle 23 rotates with respect to the connecting pipe 24.

The spray nozzle assembly 2 further includes a fixture 28, and the fixture 28 passes through the connector 21 and the bearing locating part 27, so that the bearing locating part 27 and the connector 21 are fixedly connected. A plurality of fixtures 28 are provided, and the connector 21 and the bearing locating part 27 are fixedly connected through the fixtures 28, and the fixtures 28 can realize the reliable connection of the bearing locating part 27 and the connector 21. In this embodiment, three fixtures 28 are provided. In other embodiments, the specific number of the fixtures 28 can be reasonably selected according to the actual situation.

Figure 6:
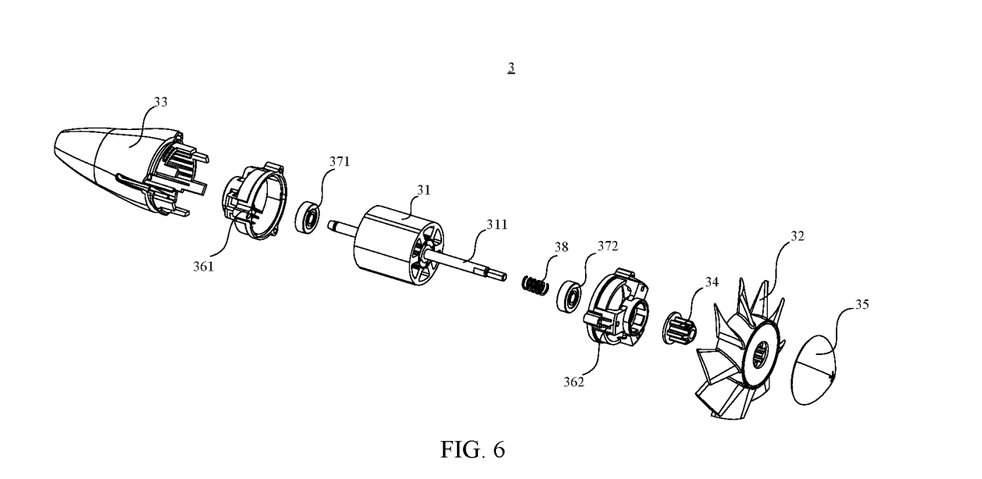
FIG. 6 is an exploded view of a fan assembly according to an embodiment of the present disclosure.
Figure 7:
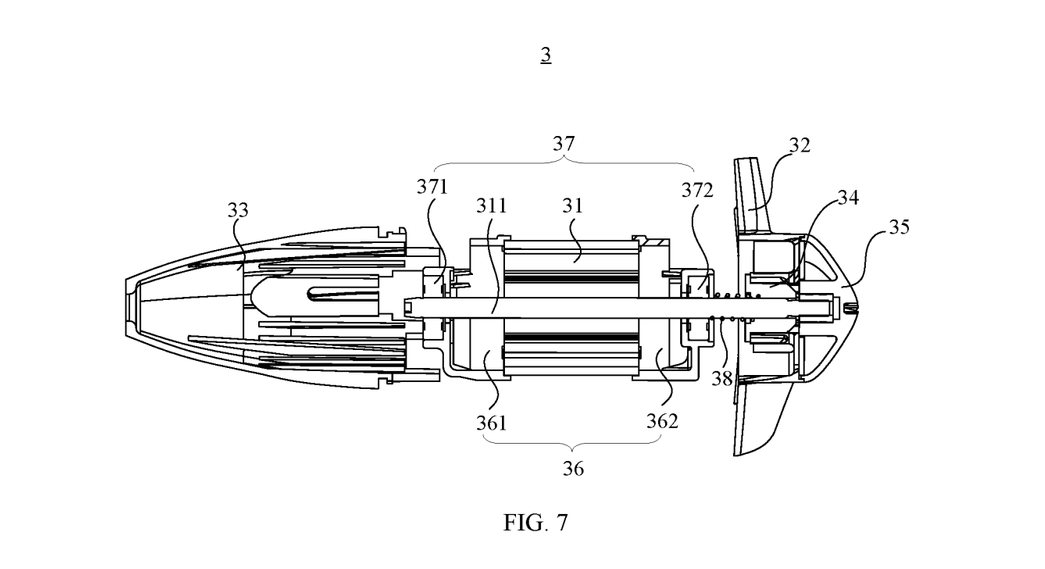
FIG. 7 is a cross-sectional view of the fan assembly according to an embodiment of the present disclosure.

As shown in FIGS. 6 and 7, the fan assembly 3 includes a motor 31 and a second blade 32 which is connected to the motor 31. The motor 31 drives the second blade 32 to rotate and generate an air flow.

The fan assembly 3 further includes a guide sleeve 33 which is connected to an end of the motor 31 facing the spray nozzle assembly 2, and is configured to guide the air flow generated by the second blade 32, so that the air flow is propelled to flow towards the spray nozzle assembly 2. Since the guide sleeve 33 can guide the airflow to flow towards the spray nozzle assembly 2, the airflow will converge after passing through the guide sleeve 33, thereby increasing the speed of the airflow to make the atomized liquid spray farther.

The guide sleeve 33 is flared towards one end of the guide sleeve 33 away from the spray nozzle assembly 2. After an airflow passes through the guide sleeve 33, the airflow converges from one end of the guide sleeve 33 away from the spray nozzle assembly 2 to the other end of the guide sleeve 33 close to the spray nozzle assembly 2, thereby increasing the speed of the airflow at the end of the guide sleeve 33 away from the nozzle assembly 2, so that the atomized liquid can be sprayed further.

The fan assembly 3 further includes a first connector 34. The second blade 32 and the motor 31 are connected through the first connector 34. The motor 31 drives the first connector 34 to rotate, so that the first connector 34 drives the second blade 32 to rotate. When the first connector 34 is damaged, the first connecting component can be replaced, thereby reducing the replacement cost of the fan assembly 3. In this embodiment, the first connector 34 is arranged on a drive shaft 311 of the motor 31, and the second blade 32 is arranged on the first connector 34.

The fan assembly 3 further includes a guide cover 35 which is arranged on the second blade 32 and is configured to guide the gas entering from the air inlet 114, so that the gas flows towards the second blade 32. Since the guide cover 35 can guide the gas to flow towards the second blade 32, the air flow will diffuse to the second blade 32 after passing the guide cover 33, thereby increasing the air intake volume of the second blade 32, so that the atomized liquid is sprayed further.

The guide cover 35 faces the second blade 32. When the gas passes the guide cover 35, the gas diffuses at an end of the guide sleeve 33 close to the second blade 32, thereby 
increasing the intake amount of the gas, so that the atomized liquid can be sprayed further.

The fan assembly 3 further includes a support group 36 which is configured to support the motor 31, and the support group 36 is connected to an inner wall of the first housing 11.

Figure 8:
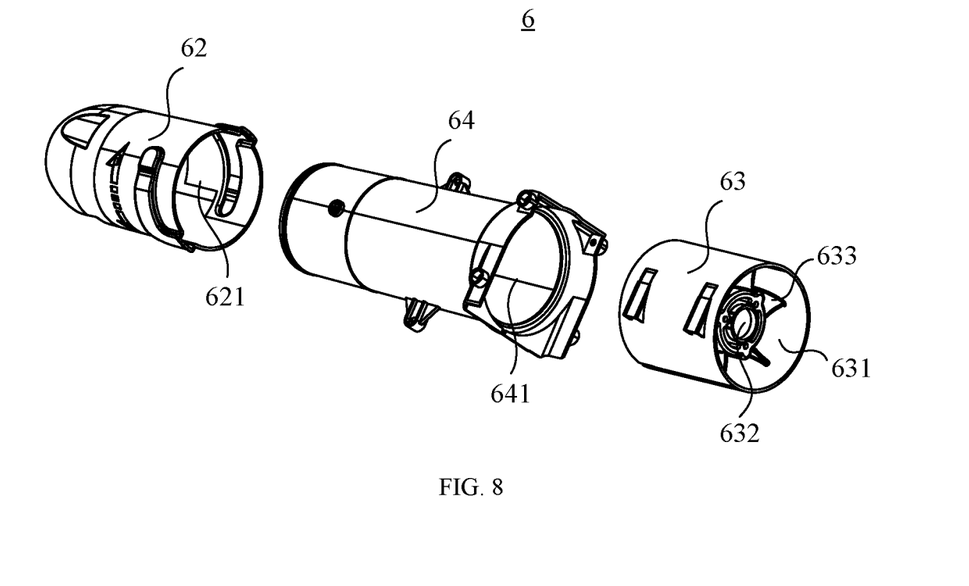
FIG. 8 is an exploded view of an air pipe assembly according to an embodiment of the present disclosure.
Figure 9:
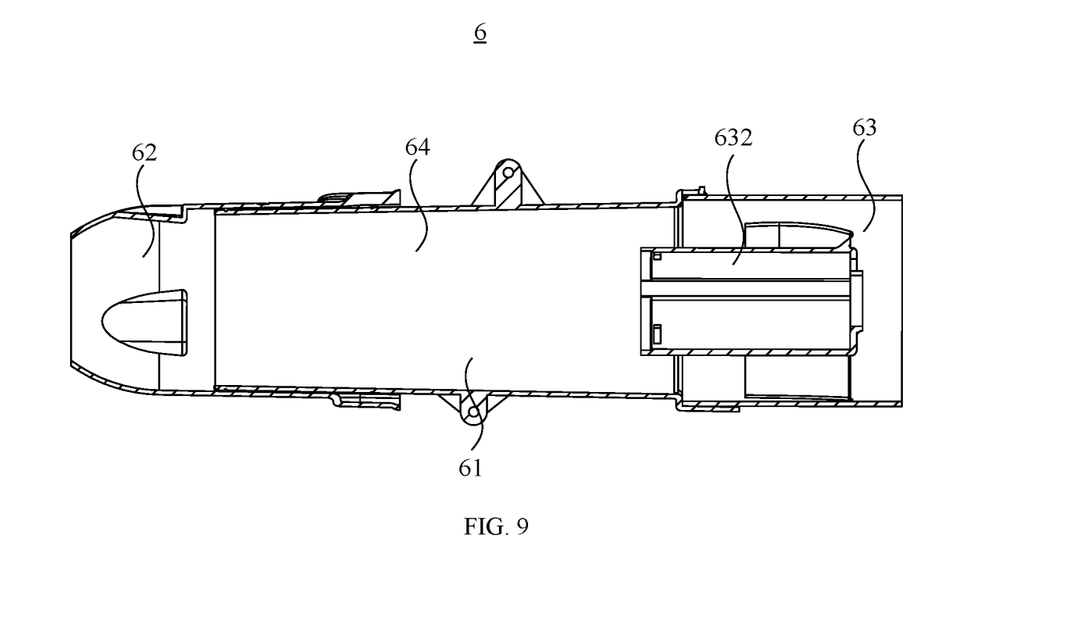
FIG. 9 is a cross-sectional view of the air pipe assembly according to an embodiment of the present disclosure.

The support group 36 includes a first support 361 and a second support 362. The motor 31 is respectively connected to the first support 361 and the second support 362. The drive shaft 311 of the motor 31 passes through the first support 361 and the second support 362, and is connected to the second blade 32.

The fan assembly 3 further includes a bearing set 37 which is configured to support the drive shaft 311 of the motor 31.

The bearing set 37 of the fan assembly includes a first bearing 371 and a second bearing 372. The first bearing 371 is arranged at the first support 361, and the second bearing 372 is arranged at the second support 362. The first bearing 371 and the second bearing 372 are respectively arranged on two ends of the drive shaft 311 of the motor 31.

The fan assembly 3 further includes a limit part 38 which is arranged on the drive shaft 311 of the motor 31, and is located between the second blade 32 and the bearing 37 of the fan assembly to restrict the bearing 37 of the fan assembly from moving with respect to the second blade 32. In this embodiment, the limit part 38 is located between the first connecting 34 and the second bearing 372. The first connecting 34 abuts the second bearing 372 through the limit part 38, so as to limit the second bearing 372 to move with respect to the second blade 32, and keep the second bearing 372 at the preset position all the time, resulting in the improvement of the reliability of the second bearing 372. In this embodiment, the limit part 38 is a spring. In other embodiments, the limit part 38 is not limited to a spring, and can be determined according to the actual situation.

As shown in FIG. 1, the sprayer 10 further includes a liquid delivery assembly 4 which is configured to deliver the liquid in the housing assembly 1 to the spray nozzle assembly 2.

The liquid delivery assembly 4 includes a pump 41, a first liquid delivery pipe and a second liquid delivery pipe. One end of the first liquid delivery pipe extends into the liquid in the second housing 12, and the other end of the first liquid delivery pipe is connected to an inlet of the pump 41. One end of the second liquid delivery pipe is connected to an outlet of the pump 41, and the other end of the second liquid delivery pipe is connected to the connecting pipe 24. The pump 41 sucks out the liquid in the second housing 12 through the first liquid delivery pipe, and the liquid is transported to the connecting pipe 24 through the second liquid delivery pipe.

As shown in FIG. 1, the sprayer 10 further includes an air inlet shield 5 which is arranged on an end of the first housing 11 close to the fan assembly 3. The air inlet shield 5 is provided with a plurality of air inlet holes which are communicated with the air inlet 114. The air inlet shield 5 is configured to filter larger impurities in the air, so as to eliminate the adverse effect on the operation of the second blade 32. In this embodiment, the air inlet shield 5 is a honeycomb structure, which can not only filter larger impurities in the air, but also allow the air to pass through the air inlet shield 5 smoothly. In other embodiments, the air inlet shield 5 is not limited to a honeycomb structure, and may also be a grid structure with quadrangular or triangular through holes.

As shown in FIGS. 8 and 9, the sprayer 10 further includes an air pipe assembly 6. The air pipe assembly 6 extends to the first housing 11 from the air outlet 115, and is connected to the first housing 11. The air pipe assembly 6 includes an air passage 61. One end of the air passage 61 is connected to the air outlet 115, and the other end of the air passage 61 is connected to the air inlet 114. The spray nozzle assembly 2 and the fan assembly 3 are respectively arranged in the air passage 61. An air flow is formed through the fan assembly 3 and blows towards the spray nozzle assembly 2 through the air passage 61. Since the air pipe assembly 6 limits the airflow generated by the fan assembly 3 in the air passage 61, the airflow is stopped to spread out of the air passage 61, which allows the airflow to have an increased speed, so that the atomized liquid can be sprayed farther.

The air pipe assembly 6 includes a first air pipe 62 and a second air pipe 63 which is connected to the first air pipe 62. The first air pipe 62 has a first sub-passage 621, and the second air pipe 63 has a second sub-passage 631. The air passage 61 is formed by the first sub-passage 621 and the second sub-passage 631. The spray nozzle assembly 2 is arranged in the first sub-passage 621, and the fan assembly 3 is arranged in the second sub-passage 631. The first air pipe 62 and the second air pipe 63 are separately arranged which can facilitate the disassembly and assembly of the air pipe assembly 6, thereby improving the disassembly and assembly efficiency of the sprayer 10. In this embodiment, the air pipe assembly 6 further includes a third air pipe 64 which is respectively connected to the first air pipe 62 and the second air pipe 63. The third air pipe 64 has a third sub-passage 641, and the first sub-passage 621, the second sub-passage 631 and the third sub-passage 641 form the air passage 61.

The second air pipe 63 further has a duct 632 which is located in the second sub-passage 631 and is configured to restrict the air flow generated by the fan 31. The motor 31 is arranged in the duct 632. The duct 632 restricts the air flow generated by the motor 31 during operation (the rotor of the motor 31 rotates at a high speed) to prevent the air flow generated by the motor 31 from interfering with the air flow generated by the second blade 32. This improves the stability of the output air flow of the second blade 32, and the atomized liquid can be sprayed farther.

The second air pipe 63 includes a flow deflector 633 which is arranged on an outer wall of the duct 632, and the flow deflector 633 is configured to guide the airflow generated by the second blade 32, so that the airflow flows towards the spray nozzle assembly 2. Since the guide sheet 633 can guide the airflow towards the spray nozzle assembly 2, the airflow will converge after passing through the flow deflector 633, thereby increasing the speed of the airflow, so that the atomized liquid can be sprayed farther.

In this embodiment, the flow deflector 633 is curved, and the bending direction of the flow deflector 633 is the same as the direction of the air flow blown by the second blade 32. When the airflow passes through the flow deflector 633, the airflow converges together along the outer surface of the flow deflector 633, thereby increasing the speed of the airflow, and the atomized liquid can be sprayed farther.

As shown in FIG. 2, the sprayer 10 further includes a blowpipe 7 which is connected to the first housing 11, and the blowpipe 7 is in communication with the interior of the first housing 11. The blowpipe 7 can increase the output path of the air flow from the sprayer 10, thereby improving the applicability of the sprayer 10.

As shown in FIG. 2, the sprayer 10 further includes a switch button 8 which is arranged on the housing assembly 1. The switch button 8 is configured to control the start and stop of the fan assembly 3 and the liquid delivery assembly 4. The switch button 8 controls the sprayer to be in a blowing mode, a spraying mode and an off mode. In a blowing mode, the fan assembly 3 works, and the motor 31 drives the second blade 32 to generate air flow; the air flow passes through the second air pipe 63, the third air pipe 64 and the first air pipe 62 in turn, and is propelled to flow out of the spray nozzle 23. In a spray mode, the fan assembly 3 works, and the motor 31 drives the second blade 32 to generate air flow; the air flow passes through the second air pipe 63, the third air pipe 64 and the first air pipe 62 in turn, and is propelled to flow out of the spray nozzle 23; and the liquid delivery assembly 4 works subsequently, in which the liquid delivery assembly 4 transports the liquid in the second housing 12 to the spray nozzle 23; the first blade 22 rotates due to the airflow, and drives the spray nozzle 23 rotates to form a vacuum environment inside the spray nozzle 23, so that the liquid from the liquid delivery assembly 4 enters the spray nozzle 23 to be atomized and sprayed under the action of atmospheric pressure. In the off mode, the liquid delivery assembly 4 and/or the fan assembly 3 are turned off. In this embodiment, the switch button 8 is arranged on the handle 113.

As shown in FIG. 2, the sprayer 10 further includes a battery 9. The fan assembly 3 and the liquid delivery assembly 4 are connected to the battery 9, respectively. The battery 9 is configured to supply power to the fan assembly 3 and the liquid delivery assembly 4.

The above are only the preferred embodiments of the present disclosure, and are not intended to limit the scope of the present disclosure. Any equivalent modification based on the concept of the present invention and uses in all other related technical fields, shall fall within the protection scope of the present disclosure.

What is claimed is:

1. A sprayer, comprising:
   a housing assembly,
   a spray nozzle assembly, and
   a fan assembly;
   wherein the housing assembly is connected to the spray nozzle assembly; the housing assembly is configured to contain a liquid, and the fan assembly is configured to generate air flow; the spray nozzle assembly is configured to atomize and spray the liquid from the housing assembly, and blow out the air flow generated by the fan assembly;
   the spray nozzle assembly comprises a connector, a first blade, a spray nozzle, a rotation shaft and a connecting pipe for transferring liquid; the first blade and the spray nozzle are arranged on the rotation shaft; the rotation shaft is rotatably arranged on the connector, and the connecting pipe passes through the rotation shaft to discharge the liquid from the rotation shaft to an interior of the spray nozzle, and the connector is connected to the housing assembly; the air flow generated by the fan assembly propels the first blade to rotate, the first blade drives the rotation shaft to rotate, and the rotation shaft drives the spray nozzle to rotate, so that the liquid from the housing assembly enters the spray nozzle and is atomized and sprayed out.

2. The sprayer of claim 1, wherein the air flow generated by the fan assembly drives the liquid sprayed from the spray nozzle to move outward.

3. The sprayer of claim 1, wherein the housing assembly comprises a first housing and a second housing which is connected to first housing; the second housing is configured to contain the liquid, and the spray nozzle assembly is connected to the first housing, and the fan assembly is arranged in the first housing.

4. The sprayer of claim 3, wherein the fan assembly comprises a motor and a second blade which is connected to the motor; and the motor drives the second blade to rotate and generate air flow.

5. The sprayer of claim 4, wherein the fan assembly further comprises a guide sleeve; the guide sleeve is connected to an end of the motor facing the spray nozzle assembly, and is configured to guide the air flow generated by the second blade, so that the air flow flows towards the spray nozzle assembly.

6. The sprayer of claim 4, wherein the first housing comprises an air inlet and an air outlet which allow an interior of the first housing to communicate with an external environment; air in the external environment enters the first housing through the air inlet, and the air flow is generated through the fan assembly and flows towards the spray nozzle assembly, and then flows outward through the air outlet.

7. The sprayer of claim 6, further comprising an air pipe assembly, wherein the air pipe assembly partially extends into the first housing from the air outlet, and is connected to the first housing; the air pipe assembly has an air passage which is respectively connected to the air inlet and the air outlet; the spray nozzle assembly and the fan assembly are arranged in the air passage; the air flow generated through the fan assembly flows towards the spray nozzle assembly through the air passage.

8. The sprayer of claim 7, wherein the air pipe assembly comprises a first air pipe and a second air pipe which is connected to the first air pipe; the first air pipe comprises a first sub-passage, and the second air pipe comprises a second sub-passage; and the air passage is formed by the first sub-passage and the second sub-passage; the spray nozzle assembly is arranged in the first sub-passage, and the fan assembly is arranged in the second sub-passage.

9. The sprayer of claim 8, wherein the second air pipe has a duct which is arranged in the second sub-passage, and the motor is arranged in the duct; the duct is configured to limit the air flow generated by the motor.

* * * * *